United States Patent [19]
Chaivre et al.

[11] 4,018,133
[45] Apr. 19, 1977

[54] CAPPED WHEEL NUT

[75] Inventors: Joseph W. Chaivre; Albert A. Jadach, both of Royal Oak, Mich.

[73] Assignee: Towne Robinson Fastener Company, Southfield, Mich.

[22] Filed: Oct. 31, 1975

[21] Appl. No.: 627,613

[52] U.S. Cl. .......................................... 85/35; 85/53
[51] Int. Cl.[2] ........................................ F16B 37/14
[58] Field of Search ................ 85/32 R, 35, 45, 53, 85/54, 55, 56

[56] References Cited
UNITED STATES PATENTS

| 529,683 | 11/1894 | Herman | 85/35 X |
|---|---|---|---|
| 532,000 | 1/1895 | Jackson | 85/35 X |
| 1,483,924 | 2/1924 | Bixbey et al. | 85/35 |
| 1,594,153 | 7/1926 | Clemens | 85/35 X |
| 1,727,590 | 9/1929 | Ferry | 85/35 |
| 1,759,917 | 5/1930 | Ross | 85/53 X |
| 1,830,787 | 10/1931 | Ferry | 85/35 X |
| 2,375,325 | 5/1945 | Robertson | 85/32 R |
| 2,795,144 | 6/1957 | Morse | 85/35 X |
| 2,850,064 | 9/1958 | Rapata | 85/32 R X |
| 3,145,751 | 8/1964 | Boots | 85/35 X |
| 3,364,806 | 1/1968 | Chaivre | 85/35 |
| 3,471,158 | 10/1969 | Solins | 85/35 X |
| 3,585,900 | 6/1971 | Chaivre | 85/35 |
| 3,960,047 | 6/1976 | Liffick | 85/32 R |

FOREIGN PATENTS OR APPLICATIONS

| 671,417 | 12/1929 | France | 85/35 |
|---|---|---|---|
| 608,864 | 9/1960 | Italy | 85/53 |
| 505,134 | 12/1954 | Italy | 85/32 R |
| 885,160 | 10/1961 | United Kingdom | 85/53 |
| 916,161 | 1/1963 | United Kingdom | 85/53 |
| 665,544 | 1/1952 | United Kingdom | 85/32 R |

Primary Examiner—Roy D. Frazier
Assistant Examiner—Thomas J. Holko
Attorney, Agent, or Firm—Krass & Young

[57] ABSTRACT

A wheel nut has a tapered end adapted to seat in the conical depression in a wheel surrounding a stud hole and sides formed with polygonal wrench flats. The flats at the nut end opposite to the taper are depressed or recessed with respect to the remaining flat surface and are connected to the unrecessed sections by a slight shoulder. A stainless steel sheath covers the recessed sections of the flat so that the free edge of the sheath abuts the shoulder. The sheath forms a domed cover surrounding the end of the nut opposite to the conical end to form an enclosure for the end of a wheel stud extending beyond the nut. In an alternative embodiment the sheath edge is bent radially outwardly and then rebent inwardly to form a flange which abuts the wheel surface surrounding a stud depression.

10 Claims, 5 Drawing Figures

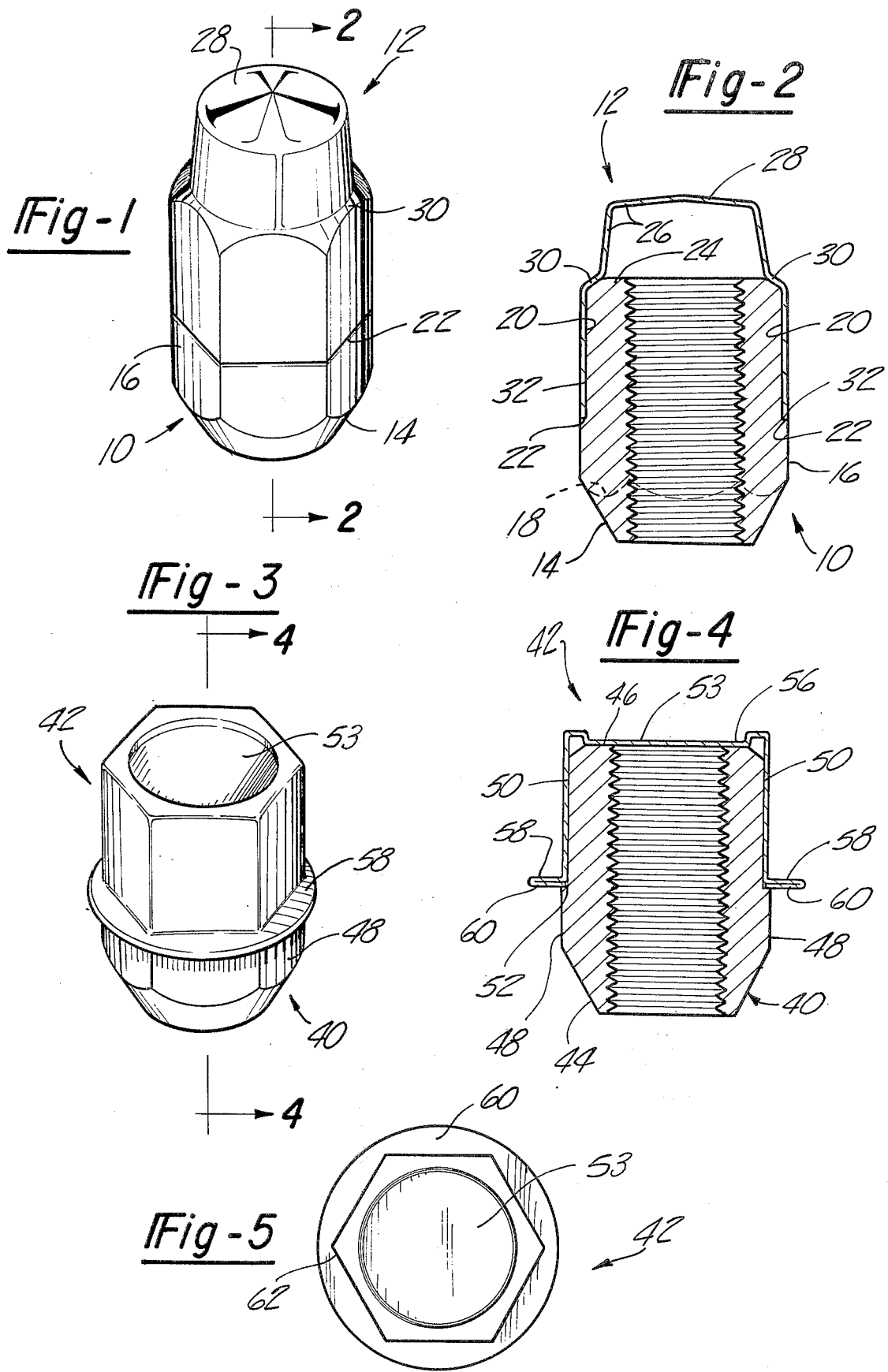

CAPPED WHEEL NUT

BACKGROUND OF THE INVENTION

1. Field of the Invention

This invention relates to wheel nuts having caps that surround the end of the nut from which a wheel stud end may project, and more particularly to such a wheel nut wherein the wrench flat's surface is formed partially by the uncovered nut body and partially by the sheath body.

2. Prior Art

Nuts having sheet metal or plastic caps enclosing the volume from which the shank of a bolt projects are commonly used to retain a wheel to the projecting studs of an axle hub. The capped volume protects the projecting end of the stud from moisture which might cause it to rust and from impacts which might damage the thread and make it difficult to remove the nut. These caps are sometimes formed of stainless steel or a decorative plastic for aesthetic reasons.

U.S. Pat. No. 3,364,806 discloses such a capped wheel nut wherein the nut end which contacts the wheel is formed with a pair of conical surfaces joined by a short cylindrical land. The sides of the nut are covered with a sheet metal sheath forming a domed cap at one end of the nut and terminates at the land between the two conical surfaces at the opposite end. The edge of the sheath makes smooth contact with the cylindrical land and the conical surface at the extreme end of the nut abuts the conical depression in the wheel surrounding a stud hole. This arrangement terminates the sheath so that the sheath does not contact the wheel, and accordingly is not loosened by forces imposed between the nut and the wheel during wrenching. However, it is relatively expensive to manufacture because of the forming operations required on the nut end and the difficulty of uniformly forming the edge of the sheath.

The present invention is broadly directed toward a capped wheel nut having all of the advantages of the nut disclosed in my previous patent, noted above, which is less expensive to manufacture.

SUMMARY OF THE INVENTION

The wheel nuts of the present invention employ a nut body or insert having a conventional, single surface conical end. The wrench flats on the sides of the polygonal body are formed with a circumferential step so that the section of the nut adjacent the conical end has a greater width than the section adjacent the opposite end; that is, the wrench flats at the end of the nut opposite to the conical end are depressed or recessed relative to the flats adjacent the conical end and the two sections are connected by a radially extending shoulder which extends around the full perimeter of the nut. In the preferred embodiment of the invention this shoulder occurs approximately midway along the length of the nut body but in alternative embodiments the shoulder could be located closer to one or the other end of the nut.

The sheath for the nut is formed of sheet material and preferably stainless steel. It has a domed body enclosing the volume surrounding the end of the nut body opposite to the conical end and the top of the domed cap is preferably spaced from the end of the body so that the stud end may project a short distance beyond the nut without contacting the cap. The sheath covers the recessed surfaces of the wrench flats and terminates adjacent to the shoulder.

In one embodiment of the invention the free edges of the sheath are in direct opposition to the shoulder so that the sheath lies fully parallel to the recessed section. In another embodiment the edge of the sheath is bent radially outwardly, normally to the section covering the recessed flats, and then rebent inwardly to form a radial flange extending outwardly from the nut body at about the position of the shoulder. This flange may be used to bear against a wheel cover having holes for the passage of the wheel stud, to retain the cover with respect to the wheel. The flanges also provide a decorative element that shields the exposed edges of the wheel recesses and prevents the accumulation of dirt between these recesses and the nut surfaces. The flanges are preferably formed relatively close to the conical end of the nut body.

With either embodiment the shoulder between the recessed and the unrecessed sections provides a convenient line of retention for the edges of the sheath.

The capped wheel nut may be finished with a chrome plating or similar decorative finish.

Other objects, advantages and applications of the present invention will be apparent by the following detailed description of two embodiments of the invention. The description makes reference to the accompanying drawings in which:

FIG. 1 is a perspective view of a capped wheel nut formed in accordance with a first embodiment of the invention;

FIG. 2 is a cross-sectional view through the nut of FIG. 1 taken along line 2—2 of FIG. 1;

FIG. 3 is a perspective view of an alternative embodiment of the invention having a radial flange;

FIG. 4 is a cross-sectional view through the embodiment of FIG. 3, taken along line 4—4 of FIG. 3; and FIG. 5 is a bottom view of the capped wheel nut of FIG. 3.

The embodiment of the invention illustrated in FIGS. 1 and 2 employs a steel nut body or insert generally indicated at 10 formed with a cap, generally indicated at 12, of sheet metal; preferably stainless steel. In alternative embodiments of the invention the cap could be formed of such materials as anodized aluminum or molded plastic. The body 10 is formed with a conventional conical end 14 adapted to engage a conical depression surrounding a stud hole in a wheel rim. The sides of the nut are formed with hexagonally arranged wrench flats 16 which join the conical end 14 in a scalloped intersection 18.

The upper halves of the wrench flats 16, that is those sections of the wrench flats adjacent the end opposite to the conical section 14, are recessed as at 20 so that their surfaces are parallel to the unrecessed sections 16. A shoulder 22 is thus formed in the nut body between the unrecessed lower section 16 and the recessed upper sections 20. In the preferred embodiment of the invention the shoulder may have a width of from 10 to 40 thousandths of an inch.

The nut end 24, opposite to the conical end 14, is covered by a section of the cap having cylindrical sides 26 and a mildly pointed conical end 28. The end 28 of the cap is spaced from the nut end 24 so that the end of the stud on which the nut is threaded may project beyond the nut end.

The cap meets the sloped shoulders of the insert adjacent the nut end 24 in a section 30 and bends around the upper edge of the nut to cover the recessed sides 20. The free edge of the cap 32 terminates in direct abutment to the shoulder 22 formed between the recessed and unrecessed sections of the flats.

The cap 12 preferably has a thickness substantially equal to the width of the shoulder so that the surface of the cap overlying the recessed sections 20 of the flats has its outer surfaces substantially coplanar with the unrecessed surfaces 16 of the wrench flats.

The nut may be chrome plated or otherwise coated to prevent oxidation of the unrecessed sections of the flats and to provide the nut with a decorative unitary appearance.

An adhesive may be used to retain the contiguous sections of the body 10 and cap 12 or the two may be resistance welded together.

When this capped nut is wrenched the forces are typically imposed on the unrecessed sections 16 and the outer surface of the cap covering the recessed sections 20. Accordingly these forces will not tend to dislodge the cap from the body and will not tend to lift the free edge of the cap away from the body.

The embodiment of the invention illustrated in FIGS. 3–5 employs a nut body generally indicated at 40 and a cap generally indicated at 42. The body 40 has one conical end 44 and a generally flat opposed end 46. The sides are formed by hexagonal flats having unrecessed sections 48 adjacent to the conical end 44 and recessed sections 50 formed adjacent to the opposite end. The recessed and unrecessed sections of the flats are joined by shoulder 52. The unrecessed sections 48 are somewhat shorter than the recessed sections 50 so that the shoulder 52 occurs in relatively close proximity to the conical end of the nut unlike the embodiment of FIG. 1 wherein the shoulder occurs at substantially the middle of the flats.

The top of the cap is not domed above the nut end as in the embodiment of FIG. 1 but is rather circularly recessed centrally as at 51 to close off the end of the nut 46. A slightly longer nut body may be used in this application to insure sufficient room for the stud end. The recess 52 extends over the inner diametric edge of the nut body to form a convenient section, as at 56, for the application of resistance welding currents.

The free edge of the flange is bent radially outwardly at 58 and then rebent radially inwardly at 60 to form a radially projecting flange. The free edge of the rebent section 60 is locked into place by abutment to the shoulder 52 at at least certain points around its periphery. As may be seen in FIG. 5, the free edge of the cap may be formed circularly so that it is tucked under the shoulder 52 at only the radially extreme points of the wrench flats, as at 62.

Having thus described our invention, we claim:

1. A capped nut for use with a vehicle axle hub having a projecting stud and a wheel having conical depressions adapted to surround the stud, comprising: a nut body having a conical end adapted to mate with said depression and polygonal wrench flats forming the body sides, the wrench flats being recessed adjacent the end opposite to the conical end, the recessed wrench flats being parallel to non-recessed wrench flats adjacent the conical end and extending closer to the central axis of the nut than the non-recessed wrench flats and being joined to the non-recessed wrench flats by a shoulder extending transversely to the axis of the nut; and a sheath formed of sheet material having a section closing the end of the nut opposite to the conical end and sections extending over the recessed wrench flats with the edge of the sheath in proximity to said shoulder.

2. The capped nut of claim 1 wherein the edge of the sheath abuts the shoulder.

3. The capped nut of claim 2 wherein the dimension of the shoulder between the recessed and unrecessed wrench flats is substantially equal to the thickness of the sheath so that the outer surface of the section of the sheath surrounding the recessed wrench flat of the nut extends in substantially the same plane as the surfaces of the unrecessed wrench flats.

4. The capped nut of claim 2 wherein the sheath is formed of sheet metal.

5. The capped wheel nut of claim 4 including a bright plating over the outer surface of the sheath and the exposed section of the nut.

6. The capped nut of claim 1 wherein the shoulder extends around the nut body about midway between its two ends.

7. The capped nut of claim 1 including a flanged section formed adjacent the edge of the sheath extending substantially normal to the central axis of the nut.

8. The capped nut of claim 7 wherein the flanged section on the edge of the sheath is formed of a pair of sections extending generally normal to the axis of nut and connected by a bent section at the radially outer end of the sheath.

9. The capped nut of claim 1 wherein the section closing the end of the nut comprises a domed section surrounding the volume at the end of the nut.

10. The capped nut of claim 1 wherein the section closing the end of the nut is comprised of a circular recess formed centrally in the top of the cap in engagement with the end of the nut.

* * * * *